No. 878,838. PATENTED FEB. 11, 1908.
M. VINCENT.
STEREOSCOPIC CAMERA.
APPLICATION FILED JULY 15, 1905.
*Fig. 1*
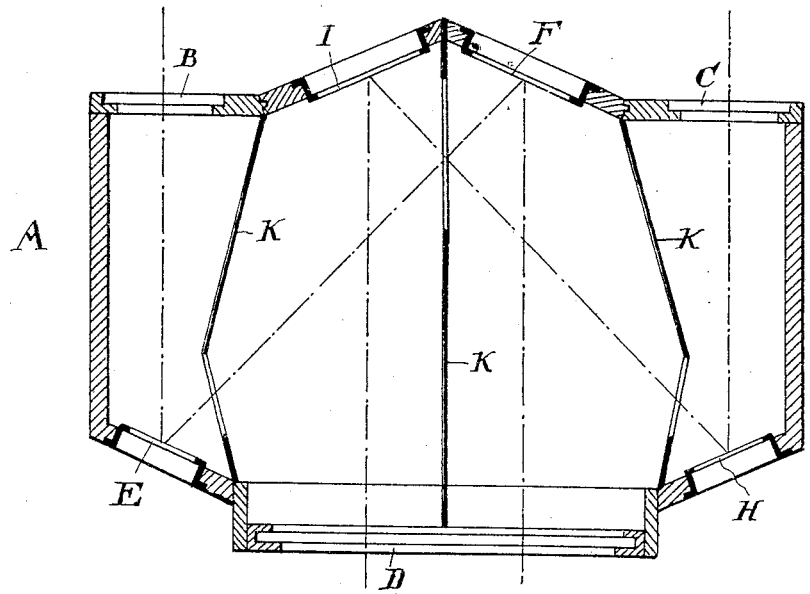
*Fig. 2.*
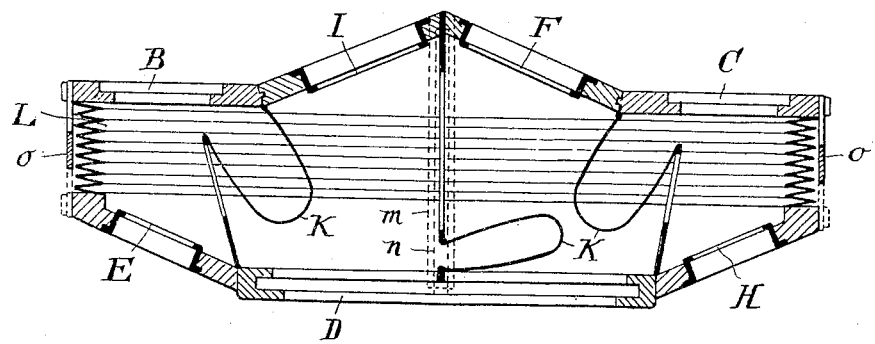
Witnesses:
M. V. Doyle.
R. M. Everett.
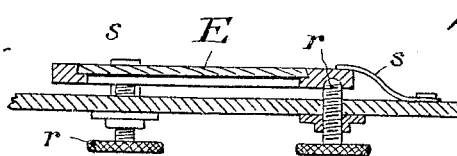
*Fig. 3.*
Inventor:
Maurice Vincent
by
Charles H. Pell
Atty.

UNITED STATES PATENT OFFICE.

MAURICE VINCENT, OF GENEVA, SWITZERLAND.

STEREOSCOPIC CAMERA.

No. 878,838.

Specification of Letters Patent.

Patented Feb. 11, 1908.

Application filed July 15, 1905. Serial No. 269,871.

*To all whom it may concern:*

Be it known that I, MAURICE VINCENT, residing at Geneva, Switzerland, have invented a new and useful Stereoscopic Camera, of which the following is a specification.

My invention relates to improvements in stereoscopic cameras, and the objects of my improvements are, first, to provide means so as to produce a crossing of the rays coming from the two objectives in such a manner that the picture formed by the left hand objective is reproduced on the right side of the sensitive plate, and the picture given by the right hand objective on the left side of said plate, and, second, to create a collapsible camera capable of being folded into a small compass, and to secure other advantages and results as will be hereinafter explained. The transposition of the light rays which produce the two parts of the stereoscopic picture avoids the necessity for cutting and reversing the negative in the manner heretofore common.

In the accompanying drawings like letters of reference indicate similar parts throughout the several views.

Figure 1 is a horizontal section of the camera; Fig. 2 is a similar sectional view of a collapsible camera when folded up and Fig. 3 is a detail.

The camera is formed by a box A which has in its front side two openings B and C intended to receive the two object glasses, and in its back side a large opening containing a grooved frame D which serves to receive and hold the ground glass, and afterwards the sensitive plate holder.

E and H are two mirrors which reflect the rays coming through the openings B, C, at the front and direct them forward in crossing lines as shown in Fig. 1 so that they impinge upon the reflectors F and I, the rays from the reflector E crossing those from the reflector H within the box, to transpose the location of the light impressions or pictures. The reflector E, is inclined to the rays entering through the opening B or through the object glass therein and is in a plane parallel with the front reflector F and the reflectors H and I are similarly related to the opening C. The reflectors I and F direct the rays in parallel lines back to the ground glass or sensitive plate lying in or in connection with the frame D.

K are screens to prevent disadvantageous light reflections in the camera, the perforations in each of said screens being in the line of passage of light rays from one reflector to the other.

The camera shown in Fig. 2 is similar to the one shown in Fig. 1 but it is rendered collapsible by interposition of a bellows L between the front and back sides of the camera, which are united by telescopic guiding means $m$, $n$, and by sliding braces $o$. In this arrangement the screens K are partly flexible.

Fig. 3 shows the arrangement of an adjustable mirror. Generally it will suffice to have one of the mirrors adjustable. The mirror E is supported by three screws $r$ and held thereupon by springs $s$. By turning said screws the mirror can be slightly inclined in any direction and thus a discordance in the position of the picture halves be readily corrected.

Having thus described the invention, what I claim as new is:

1. In a stereoscopic camera, the combination with the box and object glasses, of reflectors and means for adjusting said reflectors to change the planes at which they lie in said box, comprising springs and adjusting screws opposed to said springs, said springs holding said reflectors against the inner ends of said plates.

2. In a stereoscopic camera, the combination with the camera box, the sides of the box being formed of bellows, interior screens in the box and having light openings at the front, of a pair of oppositely inclined reflectors adapted to direct the light rays from one reflector across those from the other reflector, means for tilting the reflectors, a pair of reflectors at the front of said box adapted to receive the light rays from the first said reflectors and direct them in parallel lines to the back of said box, means to hold a sensitive plate at said back of the box, in position to receive the transposed light rays, the interior screens having rigid portions with openings disposed to allow the passage of light rays when the bellows are extended, and the remaining portions of the screens being flexible to allow collapsing of the camera box.

In testimony whereof I have hereunto set my hand in presence of two subscribing witnesses.

MAURICE VINCENT.

Witnesses:
R. SOLLBERGER,
L. H. MUNIER.